United States Patent [19]

Fujieda et al.

[11] Patent Number: 4,799,871
[45] Date of Patent: Jan. 24, 1989

[54] UNLOADER MECHANISM FOR USE WITH A VULCANIZING MACHINE

[75] Inventors: Yasuhiko Fujieda, Akashi; Itaru Amano; Masahide Kanzawa, both of Kobe, all of Japan

[73] Assignee: Kabushiki Kaisha Kobe Seiko Sho, Kobe, Japan

[21] Appl. No.: 2,939

[22] Filed: Jan. 13, 1987

[30] Foreign Application Priority Data

Jan. 16, 1986 [JP] Japan .................. 61-7364

[51] Int. Cl.⁴ .............................................. B29C 35/00
[52] U.S. Cl. ..................................... 425/38; 425/32
[58] Field of Search ................... 425/38, 32; 414/749–751

[56] References Cited

U.S. PATENT DOCUMENTS

| | | | |
|---|---|---|---|
| 3,229,329 | 1/1966 | Heston et al. | 425/38 |
| 3,712,769 | 1/1973 | Cimprich | 425/38 |
| 4,170,442 | 10/1979 | Singh | 425/38 |
| 4,190,406 | 2/1980 | Geck et al. | 425/38 |
| 4,391,769 | 7/1983 | Ishikawa et al. | 425/38 |
| 4,597,729 | 7/1986 | Singh et al. | 425/38 |
| 4,600,370 | 7/1986 | Kaneko et al. | 425/38 |
| 4,618,303 | 10/1986 | Irie | 425/38 |
| 4,618,320 | 10/1986 | Singh | 425/38 |
| 4,629,385 | 12/1986 | Irie | 425/38 |
| 4,725,212 | 2/1988 | Singh | 425/32 |

Primary Examiner—Willard Hoag
Attorney, Agent, or Firm—Oblon, Fisher, Spivak, McClelland & Maier

[57] ABSTRACT

An unloader mechanism for removing a cured tire from a lower mold of a vulcanizing machine and which includes a horizontally movable frame body, a fluid cylinder fixedly mounted on the frame body and a grappling unit being vertically movable by the fluid cylinder coaxially of the lower mold of the machine. The grappling unit includes a plurality of angularly uniformly spaced fingers being movable into an opening defined by an upper bead portion of the tire for engaging the upper bead portion. Under the application of a lifting force of the fluid cylinder, the fingers strip the tire directly from the lower mold and an upper ring of a bag well unit disposed centrally of the lower mold.

3 Claims, 4 Drawing Sheets

UNLOADER MECHANISM FOR USE WITH A VULCANIZING MACHINE

BACKGROUND OF THE INVENTION

1. Field of the Invention

The present invention relates to an unloader mechanism for removing a cured tire from a vulcanizing machine, and more particularly an improved unloader capable of removing the tire without the assistance of a bag well unit which has been customarily required for unloading the tire from the machine.

2. Description of the Prior Art

A typical vulcanizing machine includes a pair of upper movable and lower stationary molds and a central bag well unit being disposed centrally in the lower mold and having an inflatably deformable bladder. When the upper and lower molds are closed to compressingly receive a green tire therein, the bladder becomes inflated in an intimate contact with the tire interiorly thereof. Under this condition, a heated pressure medium such as high pressure steam is supplied to the inflated bladder and the molds are heated so as to vulcanize the tire. The thus vulcanized or cured tire is commonly removed from the machine according to the prior art as described hereinbelow. For instance, Japanese Patent Laid-Open Publication No. 56-148539 discloses an unloader mechanism as reillustrated in FIGS. 3A-3D of the accompanying drawings showing successive steps of the unloading operation of the mechanism.

FIG. 3A shows a vulcanizing press machine having just finished vulcanization. A movable upper mold A and a stationary lower mold B are in a closing contact with each other, and jointly hold a tire T1 therebetween. In this machine the upper mold is raised upwardly maintaining a horizontal posture thereof. A bladder 203 is supported by a central bag well mechanism C and is interiorly in intimate contact with the tire, which is heated from inside by a heated pressure medium such as a high pressure steam supplied thereinto and the two molds being heated by a suitable heat element. Designated by 391 is a tread-shaping member included in the upper mold A. Upon completion of vulcanization, the upper mold A is upwardly moved apart from the lower mold as shown in FIG. 3B. Then the bladder 203 is withdrawn from the interior of the tire T1 into the central bag well mechanism C, which is entirely raised, as shown in the drawing, to lift therewith the cured tire T1 apart from a surface of a press mold member 187 of the lower stationary mold B by retaining the tire at a lower toe ring (i.e. lower bead ring) 186 formed on an upper end of the central mechanism. Designated by 201 and 202 are bladder bead rings supporting upper and lower ends of the bladder 203, respectively. With the machine in this position, a substantially U-shaped unloader arm 294 is extended from outside of the machine to a position beneath the tire T1 to thereby hold the latter as shown in FIG. 3C. Designated by 295 is a stop member disposed at one end of the unloader arm 294. Holding the tire T1 thereon, the unloader arm 294 is angularly moved to thereby disengage the tire T1 from the lower toe ring 186 to lift the same off the central well mechanism 185. The unloader arm holding the tire T1 with assistance of the stop member retaining the rear end of the latter is retracted out of the press machine so as to transfer the same.

Another example of the typical known unloading mechanism is reillustrated in FIGS. 4A-4C, which show unloading steps successively. In FIG. 4A, designated by A, B, and C are an angularly movable upper mold, a stationary lower mold, and a central bag well mechanism vertically movably received centrally in the lower mold. A bladder 103 has a lower end fixedly connected to a lower bead ring 104 formed on an upper end of the central mechanism, and an upper end fixedly connected to an upper bead ring 105 movable independently of and accompanied by the central mechanism 102, the bladder being deformable inflatably.

FIG. 4A shows the vulcanizing machine in such a condition in that with the movable upper mold A having been angularly upwardly moved away from the lower mold after the vulcanization is completed, the central mechanism C is entirely moved upwardly carrying thereon the cured tire T1 which was lifted off the lower mold B through the bladder received in the tire T1, and the mechanism stops at an uppermost position where the upper bead ring 105 is solely moved upwardly to release the bladder 103 out of the tire by extending the bladder. Immediately before the releasing of the bladder, an unloader arm 106 enters the machine and reaches beneath the tire T1 to support the same. Then the central mechanism C is lowered together with the bladder 103 as shown in FIG. 4B, whereupon the unloader 106 is angularly upwardly moved through cam movement thereof, so that the tire T1 slides downwardly along the inclined upper surface of the unloader arm under support of the latter as shown in FIGS. 4B and 4C. Then the tire T1 moves onto a conveyor 107.

FIGS. 3A-3D and FIGS. 4A-4C show that an typical unloading mechanism and developed and/or improved versions thereof are also known. These prior unloaders are disadvantageous in that the unloader mechanism solely is incapable of removing or stripping the cured tire T1 directly from the lower mold B without assistance of the vertical movement of the central well mechanism C.

The foregoing unloader mechanisms have drawbacks in that the essential step of vertically moving the central bag well mechanism supporting the bladder tends to elongate the period of the press cycle accordingly, and in that the vulcanizing machine has a relatively great height because the machine should have an additional space for allowing the unloader to enter thereinto with the central mechanism raised into an upper position. Such unloader mechanism is apt to lift the tire from the bead end in misalignment with the lower mold, which will require additionally a tire guide unit for prevention of occurrence of such problem.

SUMMARY OF THE INVENTION

It is therefore an object of the present invention to provide an unloader mechanism for a tire-vulcanizing machine which is capable of removing a cured tire from the latter directly without assistance of any other components of the machine, particularly of a central bag well unit thereof.

Another object of the invention is to provide an unloader mechanism capable of removing a cured tire from a vulcanizing machine maintaining the tire in a stable horizontal posture without causing an objectionable misalignment thereof.

According to the present invention, an unloader mechanism for removing a cured tire from a vulcanizing machine is provided which includes a pair of upper and lower molds and a central bag well unit disposed in the lower mold for being vertically coaxially movable through the latter and having a bladder, said unloader mechanism comprising: a frame body horizontally movable toward and away from a removing position in vertical registry with an axis of the lower mold; actuator means fixedly secured to said frame body; and a grappling unit vertically movable by said actuator means toward and away from the lower mold along an axis of the latter, and including a plurality of fingers controllingly engageable with a radially inner edge of an upper bead portion of the cured tire.

The foregoing and other objects, features and advantages of the present invention will become more apparent in light of the following detailed description of the preferred embodiment thereof as shown in the accompanying drawings.

BRIEF DESCRIPTION OF THE DRAWINGS

Similar and like parts are designated by similar and like reference numerals.

DESCRIPTION OF THE PREFERRED EMBODIMENT

Figure 1:
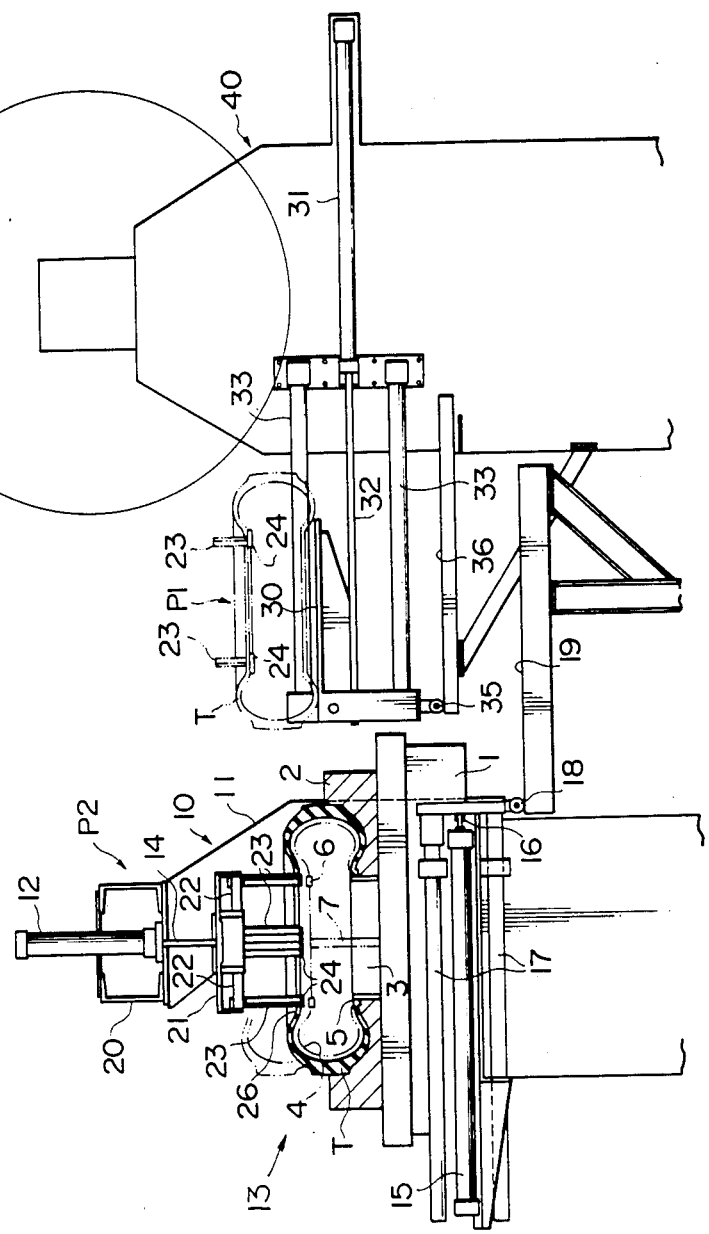
FIG. 1 is a schematic front elevational view, partly in cross section, of primary parts of an unloader mechanism according to an embodiment of the invention.
Figure 2:
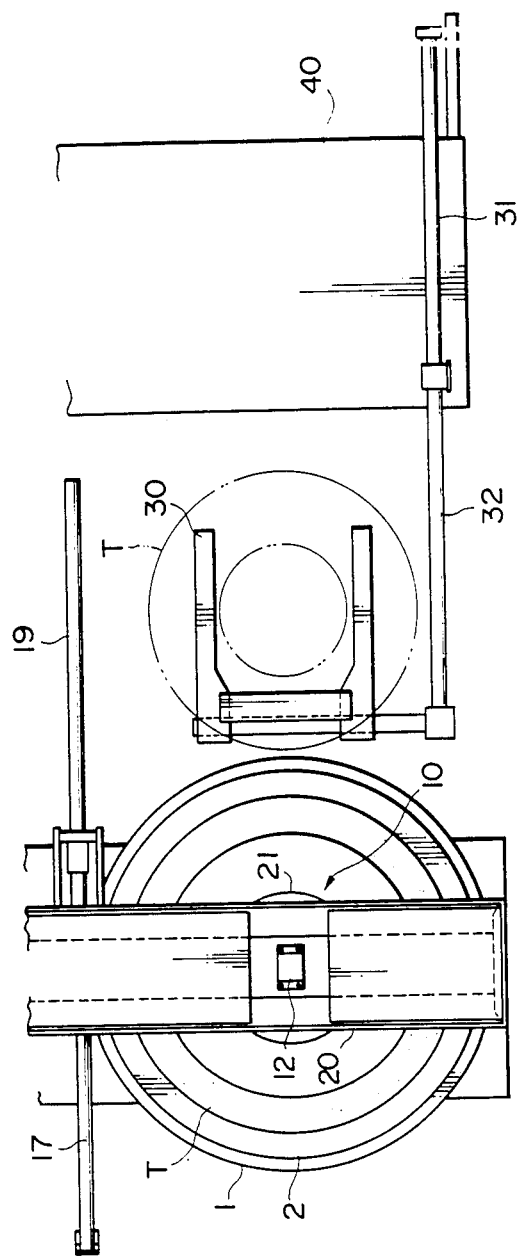
FIG. 2 is a schematic plan view of FIG. 1.
Figure 3A:
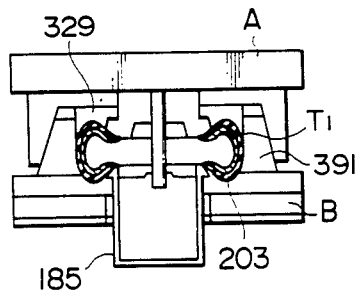
FIGS. 3A-3D are schematic elevational views of a prior art vulcanizing machine, showing successive steps of unloading of the tire.
Figure 3B:
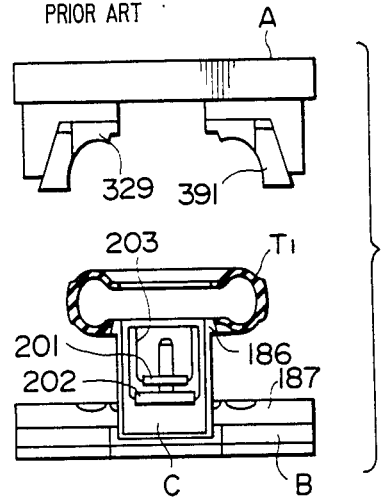
Figure 3C:
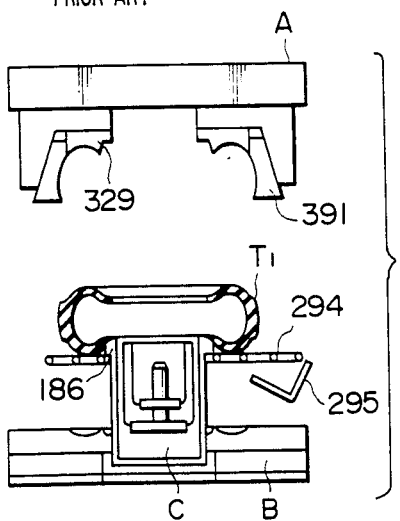
Figure 3D:
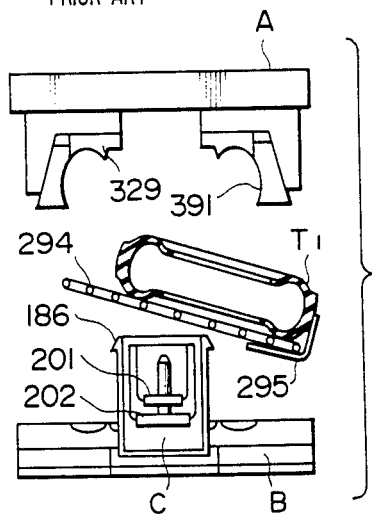
Figure 4:
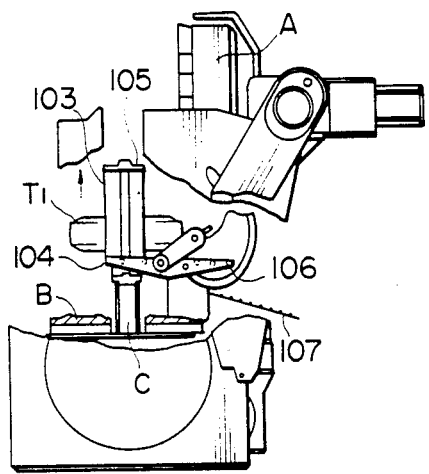
FIGS. 4A-4C are schematic elevational views of another prior art vulcanizing machine, showing successive steps of unloading of the tire.
Figure 4:
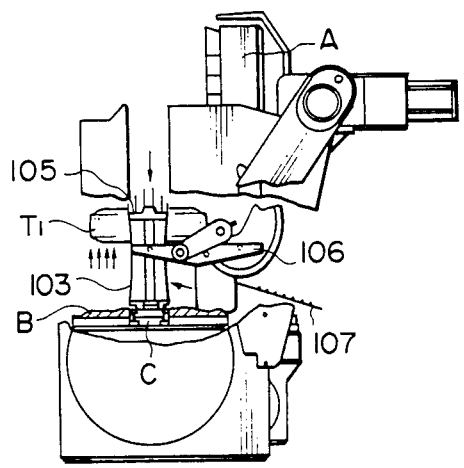
Figure 4:
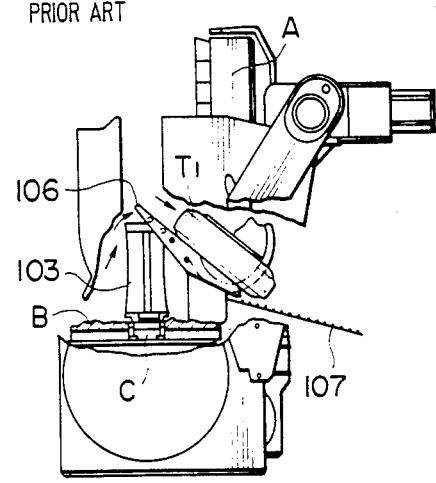

With reference to FIGS. 1 and 2, a tire-unloading mechanism according to an exemplary embodiment of the present invention, adapted to be used in a tire-vulcanizing machine, is described hereinbelow. The vulcanizing machine includes a stationary lower mold 2 fixedly supported on a press base 1 and having a heating element (not shown) provided therein in a well known manner, and a movable upper mold (not shown) being vertically or angularly movable with respect to the lower mold. A central bag well unit 3 is disposed at a center position of the lower mold 2 and is vertically movable toward and through the press base 1. As is known regarding prior art machine, the central bag well unit 3 includes an inflatably deformable bladder shown by a phantom line in FIG. 1, which is held by upper and lower bead rings 6,5 at its upper and lower edges, respectively, the upper bead ring 6 being supported by a vertically movable piston rod 7.

The tire-unloader mechanism according to this particular embodiment of the invention is generally designated by reference numeral 10 and includes a frame body 11, an actuator or fluid cylinder 12 fixedly secured to the frame , and a grappling unit 13 operatively connected to a piston rod 14 of the fluid cylinder 12. The unloader mechanism 10 is disposed horizontally movably between a first position P1 where the mechanism 10 discharges a cured tire T onto a carrier 30 which in turn transfers the same to a post cure inflator 40 and a second position P2 where the mechanism 10 removes a succeeding cured tire T from the vulcanizing machine.

The frame body 11 is operatively connected at its lower portion to a piston rod 16 of a fluid cylinder 15 disposed outside the press base 1 for thereby actuating the body 10, via a guide unit having guide shafts 17, a guide wheel 18 and a table 19, so as to be moved horizontally in parallel with the lower mold 2 in a retractable (reciprocable) manner. A support bridge 20 is disposed on an upper end of the body 10 and extends horizontally in parallel with the lower mold 2 through the entire width of the upper surface of the lower mold 2. The support bridge 20 fixedly supports the actuator cylinder 12.

The grappling unit 13 includes a holder 21 operatively connected to the piston rod 14 of the fluid cylinder 12 and thus is movable vertically upon actuation of the cylinder 12. The holder 21 is positioned in vertical alignment with an axis of the tire T resting on the lower mold 2, when the frame body 10 is in the second position P2 in FIG. 1. The holder 21 includes a plurality of radial guide bars 22 radially outwardly extending therefrom and spaced at angularly uniform intervals, and a plurality of fingers or hooks 23 slidably supported on the guide bars 22, respectively. The fingers are actuated by a suitable actuator means (not shown) such as a rotary cam plate, so as to positively move radially outwardly along the respective guide bars 22 in a synchronous manner. Every finger has a stop or lug 24 fixedly secured at its lower end.

The carrier 30 is formed of a U-shaped arm (FIG. 2) operatively connected to a piston rod 32 of a fluid cylinder 31, by which the carrier 30 is horizontally moved toward and away from the post cure inflator 40 via a guide shaft 25. Designated by 35, 36 are a guide wheel disposed at lower end of the carrier 30 and a guide rail on which the guide wheel runs, respectively.

Operation of the unloader mechanism 10 is described hereinbelow:

Upon completion of the vulcanizing of the tire T, the unillustrated upper mold is moved away from the lower mold 2, and the frame body 11 of the unloader mechanism 10 is advanced by the fluid cylinder 15 from the position P1 to the position P2 so as to be located over the lower mold 2 as shown by solid line in the drawings. The upper bead ring 6 is withdrawn by a downward movement of the piston rod 7 into the central bag well unit 3 in a timed relation with the forward movement of the body 11, and more specifically, simultaneously, so that the bladder 4 having been in intimate contact with the interior wall of the tire T is stripped from the latter to be retracted into a cavity of the central well unit 3. The upper bead ring 6 may otherwise be withdrawn before or after the frame body 11 arrives at the second position P2. Thereafter the actuator cylinder 12 disposed on the support bridge 20 in a vertically coaxial relation with the lower mold 2 is actuated to extend the piston rod 14 downwardly to bring down the grappling fingers 23 into the tire T through an opening defined by an upper bead portion of the tire T. When the fingers 23 are lowered to a lowermost position where the stops 24 of the fingers are positioned at a level lower than the upper bead portion of the tire T, the suitable actuator means is actuated to move the fingers 23 radially outwardly to be engaged by a radially inner edge of the bead portion 26 of the tire T, thus holding the tire firmly. Then the fluid cylinder 12 retracts the piston rod 14 and hence the grappling unit 21 so that the fingers 23 are upwardly moved with the upper bead portion 26 of the tire firmly held thereon with assistance of the stops 24. Consequently, the cured tire T is vertically stripped from the lower mold 2 and the lower bead ring 5 of the bag well unit 3. At this time the tire continues to take the same horizontal posture as it assumes when resting in the lower mold, and thus avoids an objectionable misalignment of the tire which could otherwise occur during the stripping operation. The tire is lifted to such a minimum extent that the lower surface of the tire T does not interfere with the upper surface of the lower mold 2. The thus stripped tire T is transferred in a stable horizontal posture onto the carrier 30 as the frame body 10 is retracted to the position P1 where the tire is discharged to be supported at its lower surface by the upper surface of the carrier 30. For discharging the tire T, the fingers 23 are moved radially inwardly to release the tire, and thereafter the fingers are raised upwardly upon the upward movement of the piston rod 14 of the fluid cylinder 12, whereupon the tire T can be immediately brought into the post cure inflator 40. Thus one cycle of the unloading operation of the tire T is completed.

With this arrangement, a cured tire is stripped one at a time from the bag well unit retaining the tire in alignment therewith and also from the lower mold on which the tire rests by the lifting force of the unloader mechanism, during which operation the bag well unit remains stationary. Therefore the press cycle of the machine is shortened substantially to such an extent that the two steps of stripping the tire from the mold and from the bag well unit are carried out at the same time, and increasing productivity of the vulcanizing machine. The present unloader mechanism enables a vulcanizing machine construction of a relatively small height partly because an additional open space for accommodating the bag well unit to be raised upwardly from the lower mold is not necessary, and partly because the cured tire is taken out of the machine maintaining a horizontal posture in parallel with the lower mold without being inclined.

Although this invention has been shown and described with respect to a preferred embodiment thereof, it should be understood by those skilled in the art that various changes and omissions in the form and detail thereof may be made therein without departing from the spirit and scope of the invention.

What is claimed is:

1. A tire vulcanizing apparatus, comprising:
   upper and lower molds;
   a tire unloader;
   a central bag well unit disposed coaxially in the lower mold for being vertically movable coaxially through the latter and having a bladder retractable thereinto;
   a frame body horizontally movable and linearly reciprocable in parallel with the lower mold toward and away from a removing position wherein said frame body is vertically in alignment with an axis of the lower molds; and
   piston actuator means fixedly mounted on said frame body and axially aligned with a grappling unit vertically movable by said actuator means toward and away from the lower mold along said axial of said lower mold and a tire coaxially received in the lower mold, and including finger means controllingly engageable with a radially inner edge of an upper bead portion of the cured tire for simultaneously removing said tire from said lower mold and central bag well unit and for substantially maintaining the same horizontal posture of said tire when in said mold.

2. An unloader mechanism according to claim 2, wherein said grippling unit comprises a holder for radially movably supporting said fingers for allowing said fingers to move radially outwardly and inwardly with respect to a center portion of said holder.

3. An unloader mechanism according to claim 2, wherein said holder comprises a plurality of guide bars extending radially outwardly from said center thereof at uniform angular intervals, said fingers being guidedly supported on said guide bars respectively for being actuated to slidably move radially outwardly and inwardly therealong.

* * * * *